United States Patent [19]

Rivers et al.

[11] 4,177,048

[45] Dec. 4, 1979

[54] BEARING BREATHER DESICCANT DEVICE

[75] Inventors: Morris R. Rivers; Ralph G. Osterman, both of Vancouver, Wash.; George H. Warmuth, Portland, Oreg.

[73] Assignee: Georgia-Pacific Corporation, Portland, Oreg.

[21] Appl. No.: 910,026

[22] Filed: May 26, 1978

Related U.S. Application Data

[63] Continuation of Ser. No. 767,373, Feb. 10, 1977, abandoned.

[51] Int. Cl.² .................... B01D 39/00; H02K 5/16
[52] U.S. Cl. ............................ 55/275; 55/385 R; 55/387; 55/515; 415/170 R; 310/90
[58] Field of Search .............. 55/275, 385 R, 387, 55/482, 515; 21/2.5 R, 74 R; 210/287, DIG. 6; 415/170 R, 170 A, 170 B; 310/90

[56] References Cited

U.S. PATENT DOCUMENTS

| | | | |
|---|---|---|---|
| 620,451 | 2/1899 | Helwig | 210/287 |
| 1,675,228 | 6/1928 | Schmidt | 55/387 |
| 2,315,049 | 3/1943 | Cronstedt | 123/198 |
| 2,335,901 | 12/1943 | Ayers, Jr. | 21/2.5 R |
| 2,528,539 | 11/1950 | Norgren et al. | 55/275 |
| 2,534,201 | 12/1950 | Hutter | 229/3.5 |
| 2,554,879 | 5/1951 | Race, Jr. | 55/275 |
| 2,595,445 | 5/1952 | Bottum | 210/DIG. 6 |
| 2,614,650 | 10/1952 | Chandler et al. | 55/275 |
| 2,816,812 | 12/1957 | Peck | 21/2.5 |
| 2,914,377 | 11/1959 | Bull | 21/2.5 |
| 3,245,737 | 4/1966 | Kleinhans | 312/31 |
| 3,246,748 | 4/1966 | Wagner | 210/94 |
| 3,297,011 | 1/1967 | Gray | 123/198 |
| 3,642,998 | 2/1972 | Jennings | 21/83 |
| 3,734,296 | 5/1973 | Proctor et al. | 210/DIG. 6 |
| 3,871,823 | 3/1975 | Skildum | 123/198 E |
| 3,879,292 | 4/1975 | McClive | 210/DIG. 6 |
| 3,990,872 | 11/1976 | Cullen | 55/515 |

FOREIGN PATENT DOCUMENTS 508855  1/1955  Canada .................. 21/2.5 R

Primary Examiner—David L. Lacey
Attorney, Agent, or Firm—Klarquist, Sparkman, Campbell, Leigh, Hall & Whinston

[57] ABSTRACT

A desiccant device for preventing rotor bearings from rusting during nonuse is described which removes moisture from the air supplied to such bearings. The air supplied to the bearings is first transmitted through the desiccant device by connecting such device to the lubrication fittings of such bearings. The bearing breather desiccant device can be connected to electrical motors, pumps, gear reducers or other equipment having rotor bearing means which tend to rust during storage or other periods of nonuse when the lubricant drains away from the surface of such bearing. The desiccant can include a moisture indicator which changes color to indicate the amount of moisture absorbed by the desiccant so that the desiccant device can be replaced before it is no longer effective. The moisture indicator is viewed through a light transparent plastic bag containing such desiccant.

16 Claims, 3 Drawing Figures

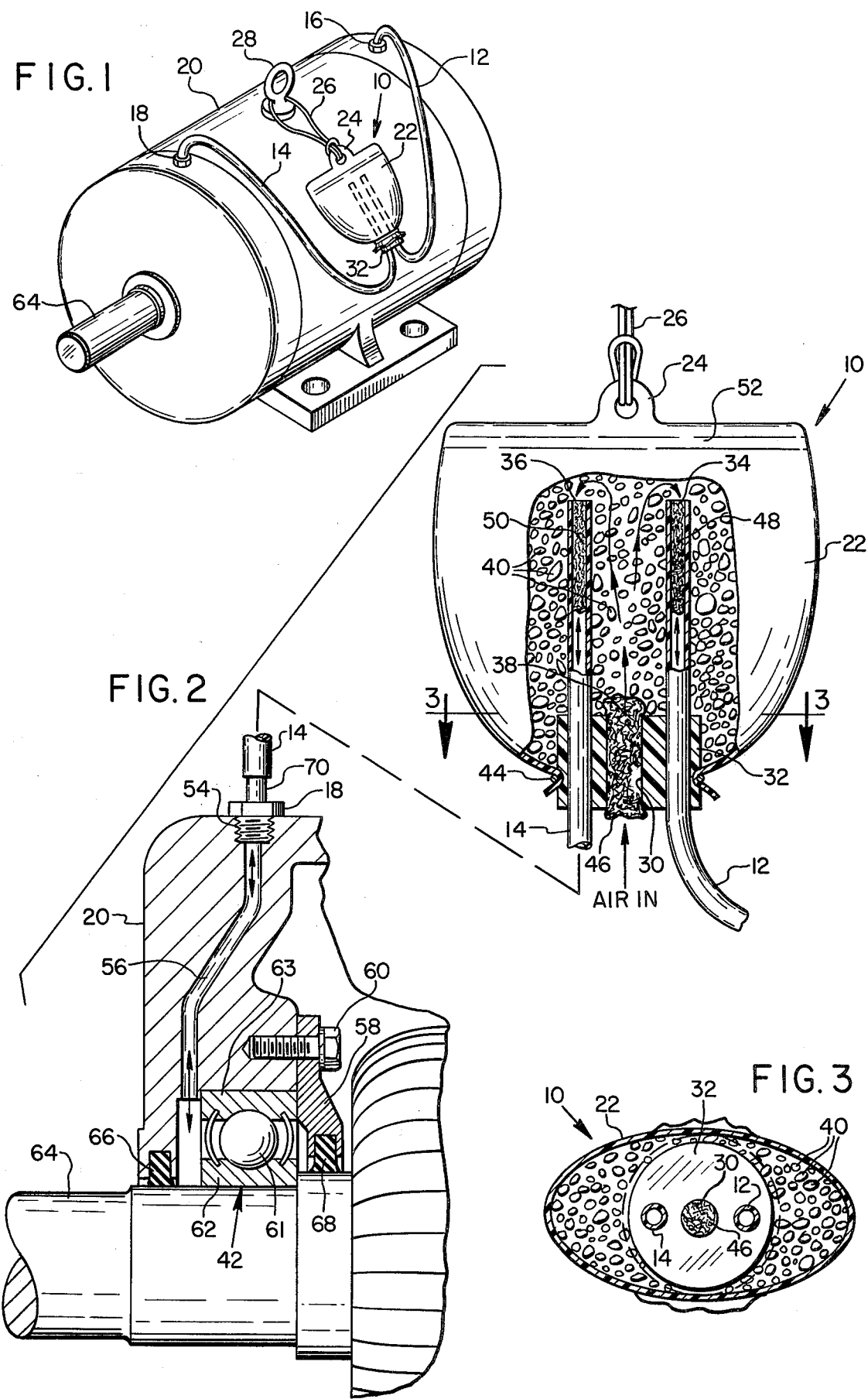

BEARING BREATHER DESICCANT DEVICE

This is a continuation application of prior pending application Ser. No. 767,373, filed Feb. 10, 1977, now abandoned.

BACKGROUND OF THE INVENTION

The subject matter of the present invention relates generally to a desiccant device for removing moisture from air supplied to the rotor bearings of motors, pumps, gear reducers and the like, to prevent such bearings from rusting. In particular, the preferred embodiment of such bearing breather desiccant device is provided with one or more outlet tubes which are connected to the lubrication fittings of the equipment containing the bearings so that any air supplied to such bearings must be transmitted through the desiccant. The present invention is especially useful in preventing the rotor bearings of electrical motors from rusting.

Previously, electrical motors, pumps, gear reducers and other apparatus having rotor bearings have suffered from the problem of bearing rust during storage or other periods of nonuse. This is caused by moisture condensing from the air onto the bearings when the temperature of the bearings falls below the dew point. Previously electrical heaters have been installed around the bearings to keep their temperatures above the dew point. Another solution has been to hermetically seal the equipment to prevent moisture laden air from reaching the bearings. However, both of these solutions are extremely expensive and cannot be employed on smaller motors, pumps and other relatively inexpensive equipment. Therefore, it has previously been the practice in these cases for a maintenance person to manually rotate the rotor shafts of the equipment every week in order to recoat the bearings with lubricant. Unfortunately this is not effective for the most part especially when the equipment is stored in direct sunlight or in a shed which is heated by the sun, because such heat causes the grease or oil used as a lubricant to drain away very quickly from the recoated bearings, often within one day. As a result, moisture condenses on the nonlubricated surfaces of the bearings, and rusting results before the shaft can be rotated manually again.

The bearing breather desiccant device of the present invention will reduce the moisture in the air supplied to the bearings and thereby prevent such bearings from rusting. All openings other than the lubrication fittings to which the tubes of the desiccant device are connected must be sealed to force the equipment to breathe air through the desiccant device. It should be noted that during nonuse equipment bearings breathe as a result of expansion and contraction of the air due to changes in the ambient temperature. The invention has the added advantage of being relatively inexpensive and easy to install on the equipment being protected. Of course, the desiccant device must be replaced when it has absorbed so much moisture that it no longer operates efficiently. This is indicated by a change in color of the desiccant which can be viewed through the wall of a transparent plastic bag containing such desiccant. While the desiccant device of the present invention greatly reduces the amount of moisture which can condense on the bearings, for added protection the rotor shafts of the motors and other equipment should still be manually rotated at regular intervals.

Previously, desiccant devices have been used in the lines of refrigerant systems to remove moisture from the refrigerant fluid, as shown in U.S. Pat. No. 3,734,296 of Proctor et al and U.S. Pat. No. 3,979,292 of McClive. It has been suggested to use a chemical moisture indicator in the desiccant device of such refrigeration systems, which changes color to visually indicate the amount of moisture absorbed, as discussed in U.S. Pat. No. 3,246,758 of Wagner. However, none of these patents suggest that a desiccant device can be used to prevent the rotor bearings of motors, pumps, gear reducers and like equipment from rusting by connecting air outlet tubes of the device to the lubrication fittings of the bearings and sealing all other air openings to the bearings in the manner of the present invention.

SUMMARY OF THE INVENTION

It is one object of the present invention to provide a bearing breather desiccant device for preventing the rotor bearings of motors, pumps, gear reducers and other equipment from rusting during nonuse by removing moisture from the air supplied to such bearings.

Another object of the invention is to provide such a bearing breather desiccant device which is inexpensive and easy to install.

A further object of the invention is to provide such a bearing breather desiccant device which can be employed on various sizes of equipment containing the bearings to be protected.

An additional object of the invention is to provide such a bearing breather desiccant device which includes air outlet tubes that are connected to the lubrication fittings of the bearings.

Still another object of the invention is to provide such a bearing breather desiccant device with a moisture indicator for the desiccant which changes color according to the amount of moisture absorbed by the desiccant and visually indicates this when viewed through a transparent container for such desiccant.

DRAWINGS

Other objects and advantages of the present invention will be apparent from the following description of a preferred embodiment thereof and from the attached drawings of which:

FIG. 1 is an elevation view showing the bearing breather desiccant device of the invention connected to an electrical motor;

FIG. 2 is an enlarged view of portions of FIG. 1 with parts broken away for clarity; and FIG. 3 is a horizontal sectional view taken along the line 3—3 of FIG. 2.

DESCRIPTION OF PREFERRED EMBODIMENT

As shown in FIG. 1, a bearing breather desiccant device 10 forming an air drying means in accordance with the present invention is provided with a pair of flexible air outlet tubes 12 and 14 of polyethylene plastic which are connected from the outlets of the device to lubrication fittings 16 and 18 of an electrical motor 20 or other rotor bearing means. The desiccant device 10 includes a container 22 which like the tubes may be a transparent plastic bag made of polyethylene or other suitable synthetic plastic. The bas is provided with a hanger eyelet 24 at its upper end to which a loop of string 26 is attached for supporting the device on the motor by looping the string over a motor carrying ring 28 attached to such motor.

As shown in FIGS. 2 and 3, the outlet tubes 12 and 14 and an air inlet passage 30 all extend through a plug member 32 of resilient rubber, or suitable synthetic plastic, to support the outlet tubes in a fixed position within the plastic bag 22 as well as to form air tight seals with such tubes and the bag. The upper ends 34 and 36 of tubes 12 and 14 respectively are spaced from the upper end 38 of the inlet passage 30 so that air transmitted through such inlet passage must pass through desiccant particles 40 contained within bag 22 before passing through outlet tubes 12 and 14 to rotor bearings 42 in the motor 20. As a result, any moisture in the air supplied to the bearings through the tubes is removed before such air is transmitted to the bearings.

The plug member 32 is a solid circular cylindrical member inserted into an opening in the bottom of the bag 22. The bag is fastened to the plug member by a cord or metal wire 44 wrapped around the bottom of the bag and tied or tightened to form an air tight seal between the bag and the plug member. A quantity of filter material 46, such as fiberglass wool, is inserted into the air inlet passage 30 to prevent the desiccant particles 40 from falling out of the bag through such inlet passage. Similarly other inserts of fiberglass wool 48 and 50 are provided in the upper ends of the outlet passages 12 and 14 to prevent desiccant particles from entering such tubes and finding their way into the lubrication fittings of the motor. Of course the fiberglass wool inserts are sufficiently porous to transmit air.

The plastic bag 22 is filled with desiccant particles through an opening in the upper end of such bag adjacent to eyelet 24. After filling, the upper opening is closed by a heat seal 52 during manufacture of the device.

The lubrication fittings 16 and 18 are each threaded into a fitting receptacle opening 54 at one end of a lubrication passage 56 extending through the motor housing to bearing 42. While any suitable rotor bearing may be employed, it is normally a ball bearing which is held in place by a closure ring 58 secured by bolts 60 to the housing. The bearing includes a plurality of balls 61, an inner race 62 fixed to motor shaft 64 or other rotor, and an outer race 63 fixed to the motor housing. A pair of resilient seals 66 and 68 of rubber or plastic are provided between the shaft 64 and the motor housing 20 and between such shaft and the bearing closure member 58 to seal the bearing. However, a layer of grease should also be provided on the shaft to prevent air from leaking through seals 66 and 68. In addition all other air holes to the bearings including drain holes should be hermetically sealed with tape. Thus any air supplied to the bearings 42 must pass through an output means including two passages 56 which are connected by outlet tubes 12 and 14 to the desiccant device 10 for connecting such bearings to the outlets of such desiccant device. This means that only dry air from which substantially all moisture has been removed is supplied to the bearing. As a result the condensation of moisture on the bearing is greatly reduced and rusting of the bearing is thereby prevented. Of course it is not possible to eliminate all moisture from the air, and there may be some air leakage past seals 66, 68 and other openings. Nevertheless, the bearing breather desiccant device of the present invention effectively prevents rusting of the bearings and greatly increases the useful shelf life of the motor, pump, gear reducer or other apparatus to which it is connected.

It should be noted that the lubrication fittings 16 and 18 may have to be replaced by different fittings in order to fit within the inner diameter of the outlet tubes 12 and 14. Therefore, when describing the outlet tubes as being connected to the lubrication fittings of the motor, the term "lubrication fittings" actually refers to the fitting receptacle openings 54. Thus, in most cases the metal lubrication fittings are removed and replaced by plastic fittings 16 and 18 to which the tubes are attached by slipping such tubes over the stems 70 of such fittings.

The desiccant particles 40 contained within the bag 22 may be made of silica gel or any other suitable desiccant material including the type which contains a moisture indicator that changes color depending upon the amount of moisture absorbed in such desiccant. Another suitable desiccant is phosphorous pentoxide which acts by absorption in chemically reacting with the water, as opposed to the physical adsorption of water by silica gel. One type of desiccant and moisture indicator suitable for this purpose is shown in U.S. Pat. No. 3,246,758. In this patent the moisture indicator is provided as a separate paper disc impregnated with the indicator chemical which is adhered to the inner surface of the container for the desiccant. However, it is also possible to provide the indicator material mixed with the desiccant material.

It will be obvious to those having ordinary skill in the art that many changes may be made in the details of the above-described preferred embodiment of the present invention, without departing from the spirit of the invention. Therefore the scope of the present invention should only be determined by the following claims.

We claim:

1. Rotor bearing apparatus, including bearing breather, comprising:
   rotor means mounted on bearings;
   housing means containing at least a portion of said rotor means including the rotor bearings and having a bearing lubrication passage for said bearings;
   drying means containing a desiccant material for removing moisture from air transmitted therethrough from an inlet to an outlet of the drying means;
   inlet means for transmitting air into the inlet of the drying means and through the desiccant to provide a source of dry air at the outlet of said drying means; and
   output means for transmitting said dry air from the outlet of said drying means through said lubrication passage to the rotor bearings to supply said dry air to said bearings.

2. Apparatus in accordance with claim 1 in which the drying means includes a container and the desiccant material is desiccant particles provided within said container whose wall is impervious to air except for the inlet and outlet of the drying means, and having an air inlet passage through the wall of said container to provide said inlet means.

3. Apparatus in accordance with claim 2 in which the output means includes at least one conduit connected at its input to the interior of the container so that said conduit input is separated by said desiccant material from said air inlet passage and connected at its output to said lubrication passage.

4. Apparatus in accordance with claim 3 in which said at least one conduit is a flexible tube and the container is sealed so that only dry air flows through the tube to the bearings.

5. Apparatus in accordance with claim 4 in which the inlet means transmits said air at atmospheric pressure through said air inlet passage which is separate from said at least one conduit, said container comprising a flexible plastic bag while the air inlet passage and the flexible tube extend through a plug member covering an opening in said bag.

6. Apparatus in accordance with claim 1 in which the rotor means is the shaft of an electrical motor and the motor is sealed so that air is supplied to the bearings only through the drying means.

7. Apparatus in accordance with claim 1 in which the drying means contains a moisture indicator which changes color according to the amount of moisture absorbed by the desiccant material.

8. Apparatus in accordance with claim 7 in which the desiccant material is provided in a container at least a portion of which is light transparent to enable observation of the indicator.

9. Apparatus in accordance with claim 8 in which the container is a bag of transparent plastic material.

10. Apparatus in accordance with claim 9 in which the output means includes at least one tube extending into the bag so that its air input end is separated by the desiccant material from said air inlet for said bag.

11. Apparatus in accordance with claim 10 in which the air inlet is provided as a passage through a plug member covering an opening in the bottom of the bag and said at least one tube extends through a hole in said plug member spaced from said air inlet passage.

12. Apparatus in accordance with claim 11 in which the top end of said at least one tube and the air inlet passage are provided with a filter material pervious to air and impervious to the desiccant material.

13. A bearing breather desiccant device, comprising:
an air tight container having an air inlet and at least one air outlet spaced from said air inlet;
desiccant material provided in said container between said air inlet and said air outlet, for removing moisture from air transmitted therethrough;
inlet means for transmitting atmospheric air to said container into said air inlet and through the desiccant material to said air outlet to provide a source of dry air;
an outlet tube connected at one end to said air outlet;
support means for supporting said container on the exterior of a housing containing a rotor bearing having a lubrication fitting; and
connection means separate from said support means, for connecting the other end of said outlet tube to the lubrication fitting of said rotor bearing.

14. A desiccant device in accordance with claim 13 in which the container is a transparent plastic bag and a moisture indicator is provided in said bag with the desiccant material to indicate the moisture content of said desiccant by color changes of said moisture indicator.

15. A desiccant device in accordance with claim 13 in which the connection means is a threaded connector.

16. A desiccant device in accordance with claim 13 in which the container is a flexible plastic bag sealed to a plug member, said air inlet is provided by an inlet passage through said plug member, said at least one air outlet is an outlet opening through said plug member spaced from said inlet passage and said outlet tube extends through said outlet opening into said bag so that its one end is separated from the inlet passage by said desiccant material.

* * * * *